US005701317A

United States Patent [19]

Yu et al.

[11] Patent Number: 5,701,317

[45] Date of Patent: Dec. 23, 1997

[54] DEVICE FOR TRAPPING LASER PULSES IN AN OPTICAL DELAY LINE

[75] Inventors: David U. L. Yu, Rancho Palos Verdes; Donald L. Bullock, Los Angeles, both of Calif.

[73] Assignee: Duly Research Inc., Rancho Palos Verdes, Calif.

[21] Appl. No.: 453,362

[22] Filed: May 30, 1995

[51] Int. Cl.[6] .............................. H01S 3/30; H01S 3/083; H01S 3/08; G21G 4/00

[52] U.S. Cl. .............................. 372/5; 372/94; 372/99; 378/119

[58] Field of Search .............................. 378/119; 372/2, 372/5, 99, 94, 74, 73

[56] References Cited

U.S. PATENT DOCUMENTS 5,353,291 10/1994 Sprangle et al. .............................. 372/5
5,495,515 2/1996 Imasaki .............................. 378/119

*Primary Examiner*—Rodney B. Bovernick
*Assistant Examiner*—Luong-Quyen T. Phan
*Attorney, Agent, or Firm*—Irving Keschner

[57] ABSTRACT

A device for maintaining a high-energy laser pulse within a recirculating optical delay line for a period time to optimize the interaction of the pulse with an electron beam pulse train comprising closely spaced electron micropulses. The delay line allows a single optical pulse to interact with many of the electron micropulses in a single electron beam macropulse in sequence and for the introduction of additional optical pulses to interact with the micropulses of additional electron beam macropulses. The device comprises a polarization-sensitive beam splitter for admitting an optical pulse to and ejecting it from the delay line according to its polarization state, a Pockels cell to control the polarization of the pulse within the delay line for the purpose of maintaining it within the delay line or ejecting it from the delay line, a pair of focusing mirrors positioned so that a collimated incoming optical pulse is focused by one of them to a focal point where the pulse interacts with the electron beam and then afterwards the pulse is recollimated by the second focusing mirror, and a timing device which synchronizes the introduction of the laser pulse into the optical delay line with the arrival of the electron macropulse at the delay line to ensure the interaction of the laser pulse with a prescribed number of electron micropulses in sequence. In a first embodiment of the invention, the principal optical elements are mounted with their axes collinear. In a second embodiment, all principal optical elements are mounted in the configuration of a ring.

30 Claims, 2 Drawing Sheets

DEVICE FOR TRAPPING LASER PULSES IN AN OPTICAL DELAY LINE

BACKGROUND OF THE INVENTION

1. Field of the Invention

The present invention provides a device for trapping a laser pulse within a recirculating optical delay line to ensure the interaction of the laser pulse with each, or at least many, of the micropulses in an electron beam train macropulse made up of a given number of closely-spaced electron micropulses. Subsequent pulses of the laser may be similarly trapped to interact with subsequent macro and micropulses in the electron beam train.

2. Description of the Prior Art

The interaction of a high-energy laser pulse with a high-energy electron beam has been utilized in the prior art to provide high-energy x-rays for studying various physical phenomenon. Other applications are to produce positrons and high-energy gamma rays. The problem is to match the relatively slow laser pulse repetition rate by a higher power laser with the much faster repetition rate of electron beam pulses. There are several ways to get a sufficiently high laser repetition rate so that it can interact efficiently with the electron beam. In particular, if only a moderate laser intensity is required, then this can be provided by a free electron laser driven by a linac. This has an additional advantage in that the laser wavelength can be longer than that for lower-energy electrons. Another prior method provides a single laser pulse which interacts many times with the electron beam by using multiple-reflections of the pulse between tilted mirrors. The laser pulse then reflects back-and-forth between the mirrors, interacting upon each round-trip passage with the electron beam, while gradually progressing (termed "walking") in a direction along the bisector of the angle formed by the titled mirrors. The pulse ultimately "walks" off the edge of the mirror system thus limiting the usefulness of this technique.

It is therefore desired to provide a device which enables optical pulses to interact with many of the electron micropulses in a single beam macropulse for extended time periods to produce x-rays, positrons, gamma rays, or other reaction products to increase production efficiency thereof.

SUMMARY OF THE PRESENT INVENTION

The present invention provides a device for ensuring that a plurality of the micropulses of an electron beam macropulse undergo a collision with a single laser pulse from a conventional low repetition rate laser by using a low-loss recirculating optical delay line to contain the pulse and present it to a number of micropulses in sequence, thus improving the production efficiency of, for example, x-rays, over existing techniques (electron micropulses, produced typically from an electron accelerator, are optionally grouped into a sequence of macropulses each comprising a predetermined number of micropulses, each electron macropulse interacting with a separate optical pulse to produce the desired reaction product micropulse). The invention comprises a polarization-sensitive beam splitter for admitting an optical pulse to and optionally ejecting it from the delay line according to its polarization of the pulse within the delay line for the purpose of maintaining it within the delay line or optionally ejecting it from the delay line; a pair of focusing mirrors positioned so that a collimated incoming optical pulse is focused by a first focusing mirror to a focal point where the pulse interacts with the electron beam and then afterwards the pulse is recollimated by the second focusing mirror; and a timing device which synchronizes the introduction of the laser pulse into the optical delay line with the arrival of the electron macropulse at the delay line to ensure the interaction of the laser pulse with the first electron micropulse in the sequence. Thereafter, the dimensions of the optical delay line ensure that subsequent collisions between the laser pulse and the micropulses are synchronized. In a first embodiment of the invention, the principal optical elements are mounted with their axes collinear. In a second embodiment, all principal optical elements are mounted in a ring, or loop, configuration.

BRIEF DESCRIPTION OF THE DRAWING

For a better understanding of the present invention as well as other objects and further features thereof, reference is made to the following description which is to be read in conjunction with the accompanying drawings wherein.

DETAILED DESCRIPTION OF THE INVENTION

Figure 1:
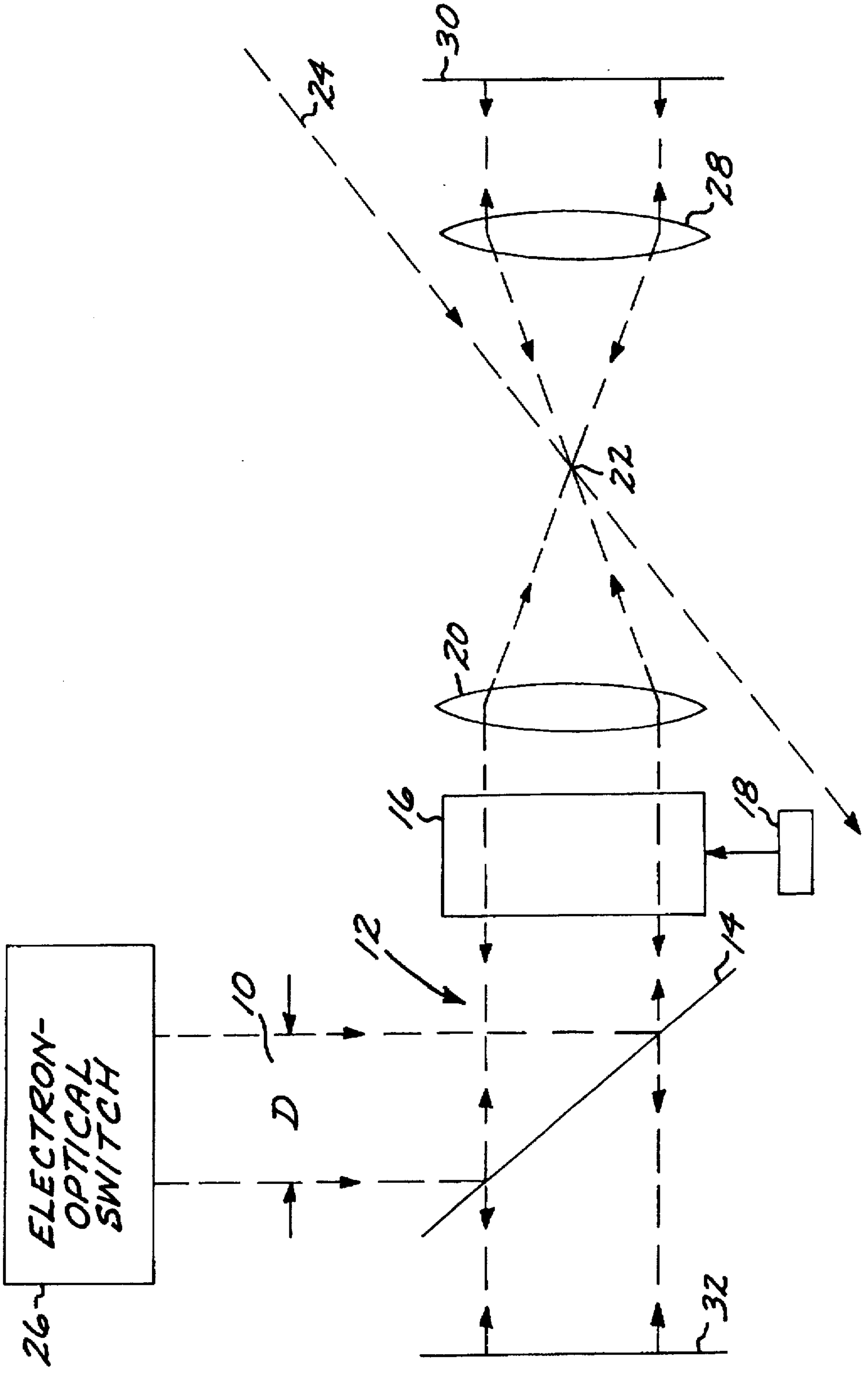
FIG. 1 is a schematic diagram of the linear version of the optical delay line of the present invention.

The present invention provides a device for ensuring that most of the micropulses of an electron beam macropulse undergo a collision with a single laser pulse from a low repetition rate laser by using a low-loss recirculating optical delay line to contain the pulse and present it to a number of micropulses in sequence.

The device has two configurations; linear and ring, each having different advantages and presenting different requirements for construction and operation.

The linear version consists of two plane reflecting mirrors positioned facing each other with a polarization-sensitive transmitting-reflecting plate, a Pockels cell, and two parabolic (actually paraboloidal, but the term parabolic is commonly used) focusing lenses positioned between them. A collimated linearly-polarized optical pulse from the laser is introduced into the delay line at a convenient angle relative to the normal to the polarization-sensitive plate by means of reflection from the plate. The linear polarization of the pulse is chosen such that it is reflected from the plate towards the Pockels cell, and the direction of propagation of the pulse subsequent to reflection from the plate is set to be normal to the surface of the Pockels cell. The polarization vector of the pulse is oriented and the Pockels cell voltage is set such that the polarization of the pulse is rotated spatially through an angle of 90° as it passes through the cell.

The pulse is then directed to a first focusing parabolic lens whose axis of rotation is collinear with the direction of propagation of the incident optical pulse. From there the pulse is focused to a focal point where it interacts with a single electron beam micropulse. The synchronization of the laser pulse and the first electron beam micropulse is controlled by a separate timing circuit. The pulse then propagates on to a second focusing parabolic lens whose axis of rotation is collinear with the first focusing lens and whose focus is coincident with the focus of the first focusing mirror. There it is recollimated and passed on to the first plane reflecting mirror, where it is retro-reflected. The pulse then passes a second time through the second focusing lens, where it is focused to the common focus of the two lenses. At the time that the optical pulse passes the second time through the focus, there is no electron beam micropulse passing simultaneously through the focus for low energy electrons. For very high energy electrons, there is no requirement to skip a micropulse. The pulse is then recollimated by the first focusing lens and passes the second time through the Pockels cell. Between the first and second passages of the pulse through the Pockels cell, the voltage on the cell is set to zero, and on this and all further passages of this optical pulse through the cell, no further rotation of the polarization occurs. The pulse then passes the second time through the polarization-sensitive plate on the way to the second plane reflecting mirror. The polarization of the pulse is now such that on this and all subsequent passes of the pulse through the polarization-sensitive plate, the pulse is transmitted. The pulse is then retro-reflected from the second plane reflecting mirror back through the polarizer plate.

This round-trip propagation process of the optical pulse through the delay line is continued until all of the electron beam micropulses have passed through the focal spot of the delay line. Upon each round-trip passage the pulse interacts with a new electron-beam micropulse at the position of the common focal point of the focusing mirrors, the round-trip passage time of the pulse being designed to ensure that the optical pulse and a micropulse arrive simultaneously at the position of the focal point.

When all of the micropulses of a single macropulse of the electron beam have passed through the focal point, the current optical pulse is allowed to decay to zero naturally in the time between electron beam macropulses. Before the arrival of the next optical pulse from the laser source, the Pockels cell voltage is restored so that the new pulse may be admitted to the delay line. Optionally, the Pockels cell voltage can also be restored prior to the arrival of the last micropulse at the focal point. In that event, the laser pulse will be ejected from the delay line upon reflection from the polarization-sensitive plate.

The process described above it repeated continually, providing for a continual source of x-ray pulses, positrons, or gamma rays.

In the ring, or loop, version of the delay line, a collimated pulse from the laser is introduced into a recirculating optical delay line by means of transmission through a polarization-sensitive plate in the same manner as in the linear version. The delay line is in the form of a closed ring, or loop, which, for illustrative purposes, is in the form of a rectangle, and is comprised of four optical elements for guiding the pulse propagation path along the sides of the rectangle, a fifth optical element in the form of a Pockels cell which rotates the linear polarization vector of the pulse through 90°, and a sixth optical element which is a polarizer plate. Two of the turning elements form reflecting sections of a paraboloid with a common focus. The other two turning elements are flat reflecting mirrors or they may form sections of a right circular cone, which is used to correct for the polarization errors introduced by the sections of the paraboloid.

The four turning elements are positioned at the four corners of the rectangle. The sides of a rectangle may then be considered to represent the path of a geometrical optics ray which circulates through the delay line repetitively. This repetitive circulation of the ray results from the following configuration of the four turning elements: At two of the corners are the two elements which are each part of the surface of a paraboloid. The symmetry axis of the paraboloid lies parallel to the side of the rectangle connecting the two paraboloid sections. The turning flats or cone lie on the other two corners of the rectangle and are oriented so that the ray from the second paraboloid section is incident and reflected from these elements so that the ray closes on its original path.

The Pockels cell is positioned along the side of the rectangle connecting the polarization-sensitive plate. The switching of the state of the voltage on the Pockels cell is used to control the admission to the ring and trapping within the ring of an optical pulse in the following manner: An optical pulse to be introduced into the delay line is directed toward the polarization-sensitive plate from outside the rectangle, with its path collinear with the first side of the rectangle and its polarization state such that it will be reflected from the element. The pulse then reflects from the element and then passes to and is transmitted through the Pockels cell. At this time the voltage on the Pockels cell and the orientation of the polarization vector of the incoming pulse are set so that the polarization vector undergoes a 90° spatial rotation. The pulse then proceeds around the rectangle, interacting with a micropulse of the electron beam at the focus of the paraboloid to produce, for example, x-rays. At the position of the polarization-sensitive plate, the pulse is transmitted through the element, rather than reflected from the element, because of its changed polarization state. With respect to the second passage of the pulse through the Pockels cell, during the time that the pulse makes its first round-trip around the rectangle, the voltage to the Pockels cell is turned off so that the polarization vector of the pulse is not further rotated. The voltage remains off until some time before the admission of the next optical pulse to the delay line. The timing of the laser pulse entry into the ring is controlled by a separate timing circuit which synchronizes it with the electron beam macropulses to ensure that the laser pulse and the electron micropulse arrive for the first time simultaneously at the interaction point, which is the focus of the paraboloid.

The round-trip path length of the rectangle is set so that the optical pulse arrives for the second time at the focus of the paraboloid simultaneously with the second (and/or subsequent) micropulses of electrons. This path length ensures that the optical pulse will arrive at the focus on subsequent passes simultaneously with subsequent micropulses. When all, or a sufficient number, of the micropulses have been interacted with, the optical pulse is allowed to decay in the delay line or allowed to be switched out of the delay line in the same manner as in the linear version. This procedure is repeated with a second injected optical pulse, timed to coincide at the focus of the paraboloid with the second macropulse of electron micropulses. This can be repeated continually.

The linear version of the invention is shown in FIG. 1. A collimated, short pulse 10 from a terawatt power level laser, such as that produced by a Ti-Sapphire laser, enters the delay line 12 by means of a polarization-sensitive reflective-transmissive plate 14. The width, D, of the beam is chosen to be of the order of 10 centimeters so that the peak flux is of the order of $10^{10}$ watts/cm$^2$. This is required so that the optical elements and coatings can survive passage of the high energy laser pulse. The linear polarization of the pulse 10 is chosen such that it is reflected from the polarization-sensitive beam splitter plate 14 towards a Pockels cell 16, and the direction of propagation of the pulse subsequent to reflection from the beam splitter 14 is set to be normal to the surface of the Pockels cell 16. The polarization vector of the pulse 10 is oriented and the Pockels cell voltage provided by source 18 is set such that the polarization of the pulse 10 is rotated spatially through an angle of 90° as it passes through cell 16. The pulse is then directed to a focusing parabolic lens 20 whose axis of rotation is collinear with the direction of propagation of the incident optical pulse. From there the pulse is focused to focal point 22 of focusing lens 20. At the focal point, the focused optical pulse intensity (photon flux) can be very high. Here it interacts with a single micropulse of the electron beam 24. The synchronization of the arrival of the laser pulse and the first electron beam micropulse is controlled by a conventional timing circuit 26. After the interaction, the pulse continues on to a collimating parabolic lens 28, and then passes to a plane reflecting mirror 30 where it is retro-reflected. Elements 28 and 30 could be replaced by a single reflecting spherical mirror with a radius of curvature equal to the spacing between focal point 22 and lens 28 if the performance is adequate. The configuration shown has the advantage that elements 20 and 28 can be translated along the optical axis of the device to help ensure that the electron beam goes through the focal point. The pulse then passes a second time through lens 28 and is focused to point 22. The pulse passes through point 22 this time at a time when there is no electron beam micropulse present, continuing onto lens 20, where is recollimated. The pulse then passes a second time through Pockels cell 16, but by this time (about $10^{-9}$ seconds) the Pockels cell voltage provided by source 18 has been turned off, so no further rotation of the polarization vector occurs. The pulse continues onto a second plane reflecting mirror 32 where it is retroreflected. It then passes to and is transmitted through the polarization-sensitive beam splitter 14 to complete a first round-trip through the delay line 12.

The round-trip passage time for the optical pulse is designed to be equal to the time between the arrival of two successive electron micropulses at the focal point 22 only at low electron energy. For high energy electron beams, it is not necessary to skip a micropulse. This round-trip passage is repeated many times as the intensity associated with the optical pulse at the focus decays steadily until the final micropulse passes through the focal point 22.

When all of the micropulses of a single macropulse of the electron beam have passed through focal point 22, the spent optical pulse is allowed to decay to zero naturally in the time between electron beam macropulses, which is approximately $10^{-3}$ seconds. The voltage to the Pockels cell 16 is turned back on in this $10^{-3}$ second window so that a new pulse may be admitted to the delay line 12 (optionally, the Pockels cell voltage could be turned on earlier to eject the laser pulse). The process described above it repeated continually, providing for a continual source of x-ray pulses, positrons, or gamma rays.

If desirable, because of losses in the delay line which can lead to optical pulse amplitude decay beyond the range that is useful before all of the micropulses of an electron beam macropulse have passed the delay line focus point 22, additional optical pulses from another laser may be introduced into the delay line 12 following the first pulse. It will be necessary to adjust the state of the Pockels cell 16 at appropriate times to trap these succeeding pulses.

Figure 2:
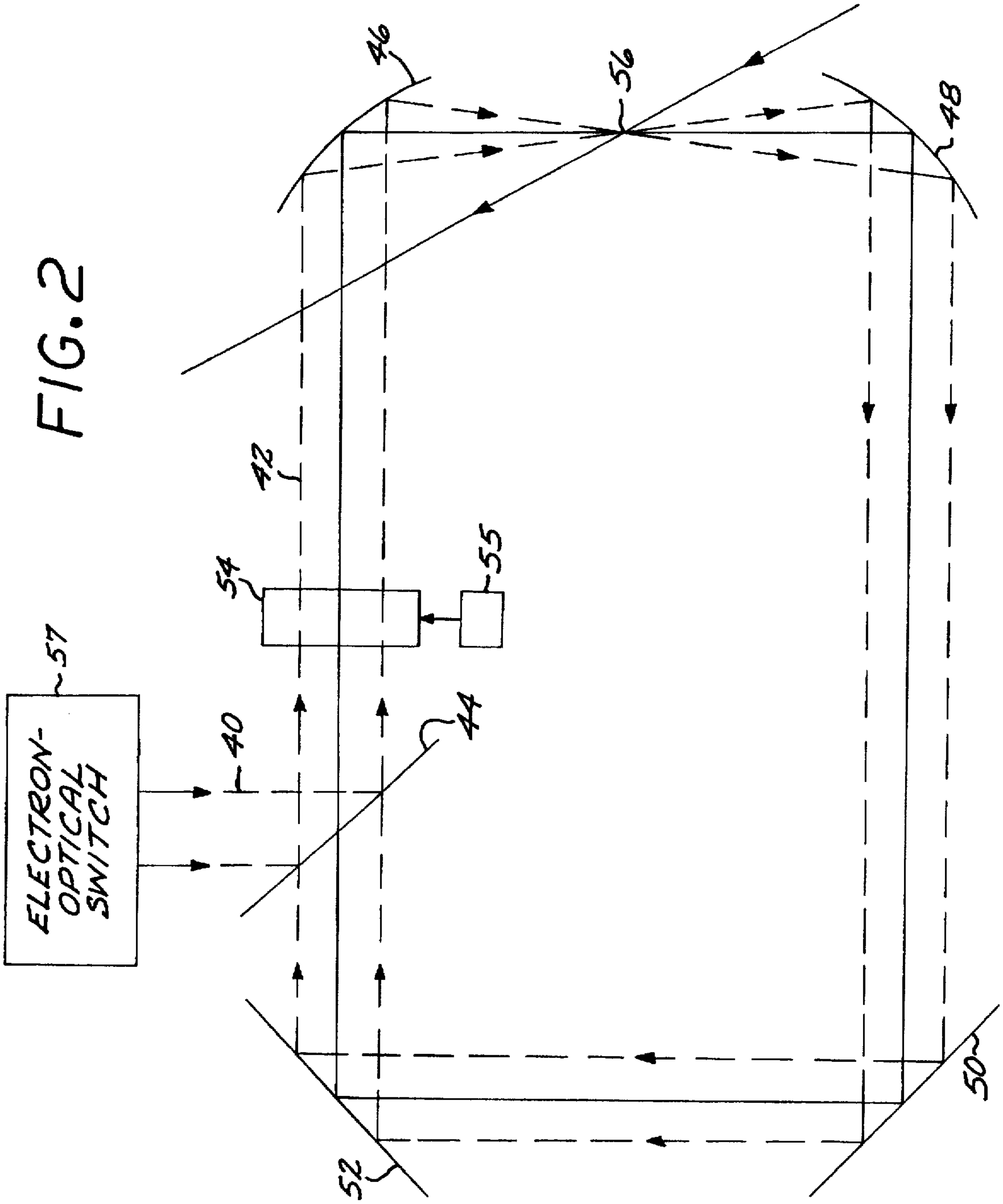
FIG. 2 is a schematic diagram of the ring version of the optical delay line of the present invention.

The ring, or loop, version of the invention is shown in FIG. 2. In this embodiment of the invention, a collimated pulse 40 from the laser is introduced into a recirculating optical delay line 42 by means of transmission through a polarization-sensitive beam splitter 44 in the same manner as in the linear version. The delay line is in the form of a closed ring, or loop, which, for illustrative purposes, is a rectangle, and is comprised of optical elements 46, 48, 50 and 52 for guiding the pulse propagation path around the sides of the rectangle, a Pockels cell 54 controlled by switch 55 which rotates the linear polarization vector of the pulse through 90° and the polarization-sensitive beam splitter 44. Turning elements 46 and 48 formreflecting sections of a paraboloid with a common focal point 56. The other two turning elements 50 and 52 form reflecting sections of a right circular cone. The need for the combination of paraboloid and cone is to correct, within one round-trip, the generation of the cross-polarized linear polarization component in those parts of the two-dimensional beam which lie under and over the plane of FIG. 2. Otherwise, this generation will lead to additional round-trip loss for the beam. The operation of the ring embodiment to trap an optical pulse and present it to sequential electron micropulses is identical to that of the linear version. The focal point 56 of the paraboloid where the interaction between the optical pulse and the electron beam occurs lies at the midpoint of the line of the rectangle connecting the two paraboloid sections.

The round-trip path length of the rectangle is set in a manner like that of the linear device, i.e., so that the optical pulse arrives for the second time at the focus of the parabolic mirrors simultaneously with the second or subsequent micropulses of electrons, etc. The path length ensures that the optical pulse will arrive at the focus on subsequent passes simultaneously with subsequent micropulses.

As in the case of the linear version of the invention, additional optical pulses can be admitted to the delay line to increase the interaction with a single electron beam macropulse.

The round-trip dimensions of the optical delay line should be selected so that the laser pulse is directed to hit the electron pulses at the focal point of the polarizer at the precise moment. The angle between the beam splitter (or polarizer) and the optical axis should ideally be equal to the Brewster angle in order to have the best polarization separation. The angle of incidence of the laser beam with respect to the optical axis is twice the Brewster angle. Electron and laser beam parameters to produce the desired reaction products vary. For example, for positron and gamma production the electron pulse energy is on the order of hundreds of GeV. For x-ray production, the electron energy is on the order of tens of MeV. The electron beam may be pulsed or CW (continuous wave). For a pulsed electron beam, the micropulse length is typically on the order of a picosecond or longer, and the micropulse spacing is typically on the order of a nanosecond or longer. The laser pulse energy is on the order of several joules.

The laser pulse is admitted into a recirculating optical delay line through a conventional, fast electron-optical switch 57.

The pulse decay time for the Pockels cell must be short relative to one round-trip time for the laser pulse to traverse the optical box so that the polarization remains the same after it has been changed after the first pass.

The present invention thus provides a simplified technique for maximizing the electron-laser interaction by trapping one or more optical pulses in a low loss optical delay line where the pulse undergoes repeated cycling through a focal point placed between an appropriate configuration of mirrors. By allowing access for the electron beam to the focal point and positioning it to overlap the focus and timing the passage of the optical pulses to coincide with the passage of an electron beam micropulse, a given optical pulse generated by a conventional high power, low repetition rate laser, is made to interact many times with the electron beam thus producing x-rays, positrons, gamma rays or other reaction products.

While the invention has been described with reference to its preferred embodiments, it will be understood by those skilled in the art and the various changes may be made and equivalence may be substituted for elements thereof without departing from the spirit and scope of the invention. In addition, many modifications may be made to adapt to a particular situation or material to the teachings of the invention without departing from its essential teachings.

What is claimed is:

1. An optical member having a centerline for trapping laser pulses comprising:

a first mirror;

a second mirror separated from said first mirror by a predetermined distance;

a polarization sensitive beam splitter positioned at an angle with the centerline adjacent said first mirror;

a Pockels cell positioned within said optical member between said first mirror and said polarization sensitive beam splitter, said Pockels cell being periodically activated;

means for introducing a collimated laser pulse within said optical member and incident upon a first surface of said polarization sensitive beam splitter; and means for introducing an electron beam into said optical cavity in a manner such that it passes through the focal point between said first and second mirrors, the laser pulse interacting with the electron beam adjacent to the area of said focal point to produce a reaction product or to diagnose the electron beam.

2. The optical member of claim 1 wherein said first and second mirrors comprise focusing parabolic mirrors.

3. The optical member of claim 1 wherein said reaction product comprises x-rays.

4. The optical member of claim 1 wherein said reaction product comprises gamma rays.

5. The optical member of claim 1 wherein said reaction produce comprises positrons.

6. A method for trapping laser pulses within an optical member having a centerline comprising the steps of:

providing a first mirror;

providing a second mirror separated from said first mirror by a predetermined distance;

providing a polarization sensitive beam splitter positioned at an angle with the centerline adjacent said first mirror;

positioning a Pockels cell within said optical member between said first mirror and said polarization sensitive beam splitter, said Pockels cell being periodically activated;

introducing a first collimated laser pulse within said optical member and incident upon a first surface of said polarization sensitive beam splitter; and introducing an electron beam into said optical member in a manner such that it passes through the focal point between said first and second mirrors, the laser pulse interacting with the electron beam adjacent to the area of said focal point to produce a reaction product or to diagnose the electron beam.

7. The method of claim 6 wherein a second collimated laser pulse is introduced within said optical member a predetermined time period after the introduction of said first laser pulse.

8. The method of claim 6 wherein said reaction product comprises x-rays.

9. The method of claim 6 wherein said reaction product comprises gamma rays.

10. The method of claim 6 wherein said reaction product comprises positrons.

11. An optical member having a centerline for trapping laser pulses, said centerline forming a closed loop path in the form of a rectangle;

a first mirror positioned at a first corner of the rectangle;

a second mirror positioned at a second corner of the rectangle and separated from said first mirror by a predetermined distance;

a third mirror positioned at a third corner of the rectangle;

a fourth mirror positioned at a fourth corner of the rectangle;

a polarization sensitive beam splitter positioned at an angle with the centerline between said first and fourth mirrors;

a Pockels cell positioned within said optical member between said beam splitter and said first mirror, said Pockels cell being periodically activated;

means for introducing a collimated laser pulse within said optical member and incident upon a first surface of said polarization sensitive beam splitter; and means for introducing an electron beam within said optical member in a manner such that it passes through the focal point between said first and second mirrors, the laser pulse interacting with the electron beam adjacent to said focal point to produce a reaction product or to diagnose the electron beam.

12. The optical member of claim 11 wherein said first and second mirrors comprise focusing parabolic mirrors.

13. The optical member of claim 11 wherein said reaction product comprises x-rays.

14. The optical member of claim 11 wherein said reaction product comprises gamma rays.

15. The optical member of claim 11 wherein said reaction product comprises positrons.

16. A method for trapping laser pulses within an optical member having a centerline, said centerline forming a closed loop path in the form of a rectangle comprising the steps of:

providing a first mirror positioned at a first corner of the rectangle;

providing a second mirror positioned at a second corner of the rectangle and separated from said first mirror by a predetermined distance;

providing a third mirror positioned at a third corner of the rectangle;

providing a fourth mirror positioned at a fourth corner of the rectangle;

providing a polarization sensitive beam splitter positioned at an angle with the centerline between said first and fourth mirrors;

positioning a Pockels cell within said optical member between said beam splitter and said first mirror, said Pockels cell being periodically activated;

introducing a first collimated laser pulse within said optical member and incident upon a first surface of said polarization sensitive beam splitter; and introducing an electron beam within said optical member in a manner such that it passes through the focal point between said first and second mirrors, the laser pulse interacting with the electron beam adjacent to said focal point to produce a reaction product or to diagnose the electron beam.

17. The method of claim 16 wherein a second collimated laser pulse is introduced within said optical member a predetermined time period after the introduction of said first laser pulse.

18. The method of claim 16 wherein said reaction product comprises x-rays.

19. The method of claim 16 wherein said reaction product comprises gamma rays.

20. The method of claim 16 wherein said reaction product comprises positrons.

21. A device for trapping a short optical pulse to allow it to collide repeatedly with a plurality of closely spaced electron micropulses in sequence to produce the desired reaction product or to diagnose the electron beam, comprising a recirculating optical delay line into which an optical pulse and a train of electron micropulses are introduced, the trapped optical pulse interacts with a plurality of electron micropulses in succession.

22. The device of claim 21 further including means for synchronizing the arrival time of the optical pulse and the electron micropulses at the collision point.

23. The device of claim 22 wherein the length of said optical delay line is selected to coincide with the predetermined spacing between electron micropulses to provide said synchronizing means.

24. A method for trapping a short optical pulse to allow it to collide repeatedly with a plurality of closely spaced electron micropulses in sequence to produce the desired reaction product or to diagnose the electron beam, comprising the steps of introducing an optical pulse and a train of electron micropulses into a recirculating optical delay line, the trapped optical pulse interacting with a plurality of electron micropulses in succession.

25. The method of claim 24 further including the step of synchronizing the arrival time of the optical pulse and the electron micropulses at the collision point.

26. The method of claim 25 further including the steps of selecting the length of the optical delay line to coincide with the predetermined spacing between electron micropulses to provide said synchronization.

27. A method for trapping a short optical pulse, enabling it to collide repeatedly with a long electron pulse to produce the desired reaction product or to diagnose the electron beam comprising the step of introducing an optical pulse and a long electron pulse into a recirculating optical delay line.

28. The method of claim 27 further including the step of maximizing the number of collisions between the short laser pulse and the long electron pulse at the collision point.

29. The method of claim 28 wherein the length of said optical delay line is selected to coincide with the predetermined number of collisions between the short laser pulse and the long electron pulse.

30. A method for trapping an optical pulse to allow it to collide repeatedly with a continuous wave electron beam to produce the desired reaction product or to diagnose the electron beam comprising the steps of introducing an optical pulse and the continuous wave electron beam into a recirculating optical delay line, the trapped optical pulse interacting with the continuous wave electron beam in multiple collisions in succession at the collision point.

* * * * *